United States Patent [19]
Koch et al.

[11] 3,899,965
[45] Aug. 19, 1975

[54] ROLL PRESS

[76] Inventors: Friedhelm Koch, Bergstrasse 1b; Walter Siepermann, Konigsteiner Strasse 90, both of 432 Hattingen, Ruhr, Germany

[22] Filed: Feb. 6, 1974

[21] Appl. No.: 439,891

[30] Foreign Application Priority Data
Feb. 6, 1973 Germany............................ 2305626

[52] U.S. Cl................. 100/155; 100/168; 100/176; 72/138; 241/232; 241/285 B; 308/DIG. 10; 425/237

[51] Int. Cl............................. B30b 3/00; B30b 3/04

[58] Field of Search............ 100/155, 160, 168–172, 100/176, DIG. 6, DIG. 7, DIG. 8; 425/237, 363; 308/DIG. 10, 189 R; 72/138, 139; 241/227, 230, 232, 285

[56] References Cited
UNITED STATES PATENTS

| | | | |
|---|---|---|---|
| 1,366,463 | 1/1921 | Jones | 241/232 |
| 3,049,074 | 8/1962 | Mellin | 100/168 X |
| 3,845,708 | 11/1974 | Liebert | 100/155 |

*Primary Examiner*—Peter Feldman
*Attorney, Agent, or Firm*—Salter & Michaelson

[57] ABSTRACT

A roll press having easily removable rolls in which the rolls rest in bearing blocks movably mounted on parallel guides in the press frame and held in place by lateral top pieces. These top pieces may be pivoted downwards to be horizontally with its upper surface presenting a continuation of the roller bearing guideway through which the rollers may be easily removed.

3 Claims, 2 Drawing Figures

PATENTED AUG 19 1975 3,899,965

ROLL PRESS

FIELD OF THE INVENTION

The present invention relates to a roll press, of which the roll bearings rest in bearing blocks which are kept in a movable manner in parallel guides in the press frame, the parallel guides starting from the front sides of the press frame and extending horizontally into the lateral frame parts of the press designed as a cradle, and wherein the bearing blocks which bridge the open front sides of the parallel guides are fixed in the parallel guides by means of top pieces, and more particularly to such a roll press in which the rollers may be quickly and easily removed or replaced.

BACKGROUND OF THE INVENTION

Essentially, roll presses of this type consist of a frame, pairs of oppositely rotating rollers, a gearing, and a drive and, furthermore a feed system mounted above the rollers. Preferably the roll presses will be used for manufacturing coal, ore and mixed briquettes. Depending upon the kind of material to be processed, the rollers or the molding parts mounted on the roll bodies are subject to varying wear, so that they require chronic replacement. In order to prevent lengthy shutdowns, the sets of rollers are periodically exchanged against newly equipped roller reserve sets that were previously overhauled by the supplier. The present invention addresses the task of reducing the expenditures involved in this assembly of roller sets and hence the costly shutdown times of the roll press.

It is known in the art how to design the roller frame in parts that may be divided approximately at the level of the roller bearing, the roller bearings or their roller bearing housing being mounted in a gliding manner between the divisional surfaces. The roller forces will pass through the bearing housing directly, or via roller adjusting systems that as a rule are hydraulic-pneumatic in nature, to a front side mounted frame-end piece, so-called top-pieces, which in turn will pass on the roller forces through strong shear bolts or similar to the tension chords of the press frame which are ordinarily fastened by welding. The division faces of the frame are designed in wholly planar manner, so that after loosening the frame end-pieces and possibly also any intermediate pieces, the upper part of the frame together with those feed systems that are present may be lifted by means of a crane or the like and be slightly moved sideways, whereupon the roller sets to be exchanged will be pulled out on the lower division surface of the press frame which will then be acting as a gliding surface, said sets being pulled out underneath the lifted upper part, or else being rolled forward on rails especially provided to that end, said sets then being ready to be removed. It is obvious that the dismantling and lifting of the entire upper part of a roller press together with the subsequent required fit-accurate assembly of the press frame will cause considerable time expenditure for assembly and shutdown of the roll press, and further will only be feasible if sufficient space for lifting the dismantled upper part of the press is available above the installed roll press.

Said space for lifting the upper part of a roll press is not required as regards a known press wherein the press frame is one single piece. Horizontal, lengthwise rectangular cut-outs starting from the vertical front sides are provided in the lateral frame parts, said cut-outs seating the bearing housing or the roll bearing. The bearing housings are kept in place in the cut-outs by means of frontside bridges and corresponding locking bolts. This known roll press suffers from the drawback that the roll-sets (sets of rolls) following removal of the front side bridges, may be pulled out of the press frame only with appreciable expenditure in time and use of assembly or disassembly structures if the roll-sets are not to suffer damage to the frame or to the rollers.

SUMMARY OF THE INVENTION

The drawbacks encountered in the above-described roll presses of this kind are avoided by the present invention by connecting at least one top bridge in pivotal manner with the press frame, said top bridge pivoting about a lower horizontal axis, in that the inside face of the top bridge is designed as a gliding surface, and in that the pivoting axis is so trued, that the gliding surface will form an extension of the lower gliding surface of the parallel guide when the top bridge is swung down. An advantageous embodiment of the invention provides for mounting a support at the outer face of the top bridge, said support being of such dimensions that the gliding surface will be mounted in the plane of the lower gliding surface of the parallel guide when the top bridge is swung down.

As regards the roll press of the invention, exchanging the roll sets merely requires loosening the upper clampings of the top bridges, swinging down the top bridges, removing any mechanical or hydraulic-pneumatic roll setting systems that may be present, and pulling forward the roll sets in a simple manner by means of constructional pulling devices, thereby bringing the roll sets to the gliding surfaces, so that they may be easily and without any difficulty whatever be received and removed. Lifting the upper roll part, or a fit-accurate truing of a press plane that is divided, or assemblying and dismantling with the necessity of an auxiliary assembly structure, etc., are superfluous, extremely short shutdown times being typical for changing worn or damaged roll-sets in a roll press in conformity with the present invention.

BRIEF DESCRIPTION OF THE DRAWINGS

An embodiment of the invention will be described below in further detail in relation to the drawings.

DETAILED DESCRIPTION OF PREFERRED EMBODIMENTS

Figure 1:
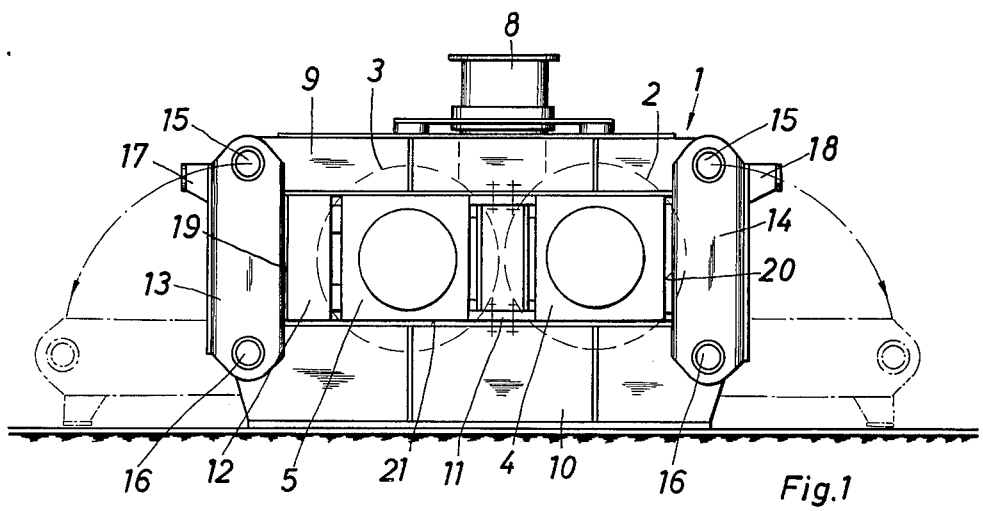
FIG. 1 is a side view of a roll press in conformity with the present invention.
Figure 2:
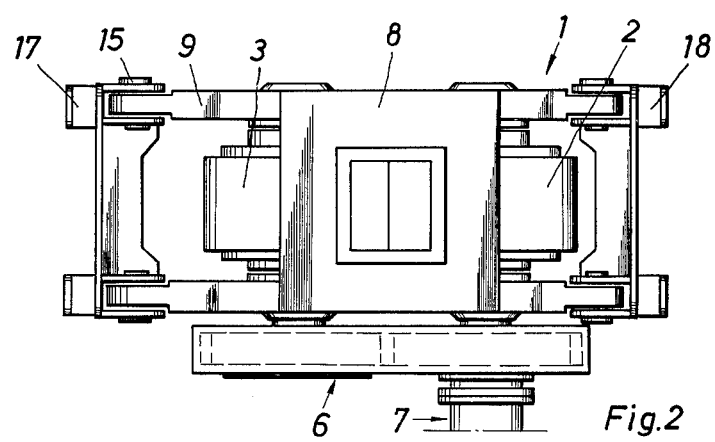
FIG. 2 is a top view of the roll press of FIG. 1.

The roll press shown consists essentially of press frame 1, of the two press rollers 2 and 3, with the bearings resting in the bearing housings 4 and 5, of the gearing 6 and of drive 7. A feed system 8 is mounted on frame 1 above press rolls 2 and 3.

Press frame 1 is designed and built in a conventional manner by welding, absorbing all forces inside the frame. In every case, one frame face will consist of upper and of lower welded tensional chords 9 and 10 which together will form a parallel guide for bearing housings 4 and 5. A spacer 11 keeping both bearing housings at the required minimum distance is placed between the two bearing housings 4 and 5 so that in no case touching of the opposite rotating rolls will be feasible, said spacer being located inside the parallel guides. This spacer may be bolted or solidly welded to the tension chords 9 and 10 of a roll press in conformity with the present invention.

As a rule, a press roller as shown by roller 2 is designed to be stationary, but the movable roller 3 most of the time will rest on top bridge 13 by means of a hydraulic roll setting system 12. Stationary roll 2 is frozen into position in the parallel guides by means of top bridge 14, making use of an appropriate number of spaces. As regards an appropriate embodiment of the invention, top bridges 13 and 14 will be fastened to tension chords 9 and 10 of the press frame by means of upper, detachable, and lower cross-bolts 15 and 16. The top bridges 13 and 14 of the roll press shown are provided with external supports 17 and 18 which are so dimensioned that gliding surfaces 19 and 20 will lie in the plane of the lower gliding surface 21 of the parallel guides when the top bridges are swung down (shown in dot-lines).

When the top bridges are swung down, bearing housings 4 and 5 may be pulled forward in an easy manner as far as glide surfaces 19 and 20, respectively, of said top bridges, once the hydraulic roll setting system 12 has been removed, or after removal of any present spacers. The roll sets thereby will be carried into a position in which they are easily accessible and may be most readily maintained or repaired or shipped off.

It will be obvious to those skilled in the art that various changes may be made without departing from the scope of the invention and the invention is not to be considered limited to what is shown in the drawings and described in the specification.

What is claimed is:

1. In a roll press in which roll bearings rest in bearing housings movably kept in parallel guides in the press frame, and wherein the bearing housings bridge the parallel guides and are fixed in these guides by means of lateral top pieces, at the ends of said guides, the improvement wherein:

at least one of said top pieces is pivotably connected about a lower horizontal axis to said press frame and wherein the inside surface of said pivotably mounted top piece is designed as a gliding surface and wherein said pivoting axis is so trued that said gliding surface forms an extension of said parallel guide when said top piece is pivoted into a horizontal position whereby the rollers may be easily removed by sliding therealong.

2. A roll press in accordance with claim 1 further including a support mounted on the outer face of said pivotably mounted top piece, said support being so dimensioned as to cause the sliding surface of said top piece to be supported in the plane of said parallel guide when said top piece is swung down.

3. A roll press in accordance with claim 1 wherein said top piece is fixed to said press frame by means of an upper detachable cross-bolt and a lower cross-bolt.

* * * * *